Feb. 6, 1940. S. H. BERCH 2,189,512
METHOD AND MEANS OF PACKING FOOD PRODUCTS AND THE LIKE
Original Filed Oct. 25, 1938
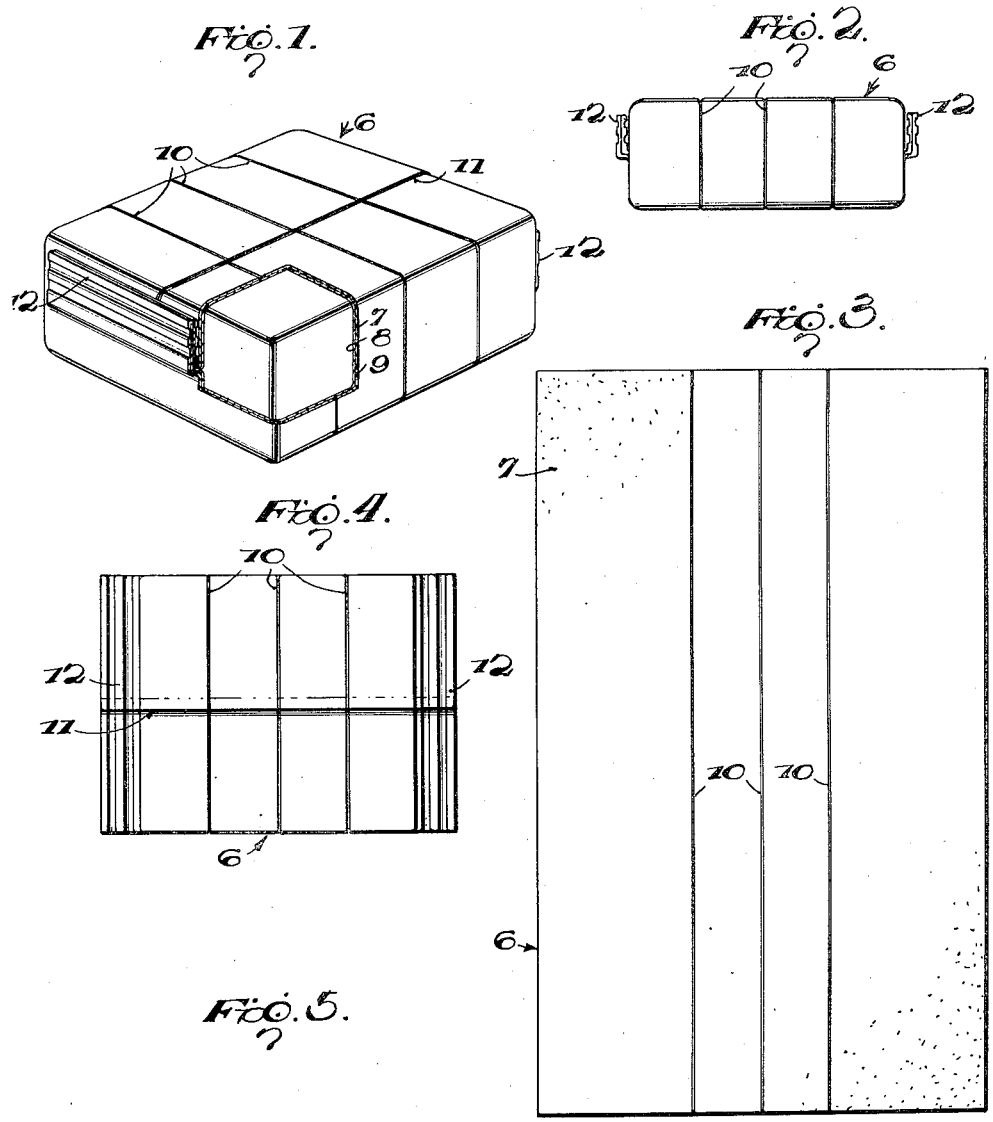
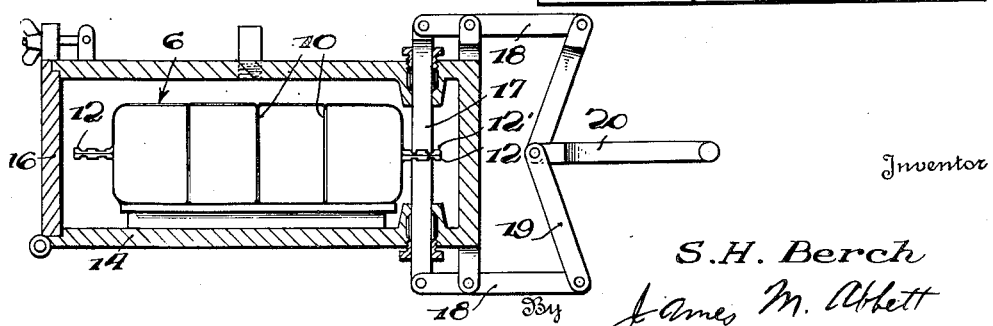
Inventor
S. H. Berch
By James M. Abbett
Attorney Patented Feb. 6, 1940

2,189,512

UNITED STATES PATENT OFFICE 2,189,512

METHOD AND MEANS OF PACKING FOOD PRODUCTS AND THE LIKE

Samuel H. Berch, Beverly Hills, Calif.

Application October 25, 1938, Serial No. 236,965
Renewed November 30, 1939

8 Claims. (Cl. 99—152)

The present invention relates to a method and means of packing, preserving and dispensing food products.

It is common practice to pack perishable food products in hermetically sealed containers of glass or metal, some products, such for example as meats, spices, coffee, tea and the like, are sealed within containers under partial vacuum. In the case of coffee and other food products evolving gas a large amount of experimental research has been performed, such for example as by the experimental laboratories of Columbia University, and it has been found that roasted coffee develops a material quantity of carbon dioxide gas. The carbon dioxide gas represents the aroma and flavor of the coffee, and the research of the Columbia University has proven that the loss of carbon dioxide appears to be closely related to the loss of flavor and aroma in coffee. This liberation of the occluded gases takes place after roasting and experimental tests prove that within a few days after the roasting of the coffee from forty to fifty per cent of the carbon dioxide gases have been liberated from the coffee and the relative freshness of the coffee has dropped in like proportion. Research has also demonstrated that the presence of atmospheric air causes the coffee to become stale and permits oxidation of the coffee oils so that a two-fold action takes place in roasted coffee, one being the liberation of occluded gases to deplete the coffee of its characteristic freshness, and the other being the oxidization of the coffee oils in the presence of atmospheric air to cause the coffee to become rancid. It is, therefore, one of the principal objects of the present invention to provide a method and means of packing coffee in flexible containers in a manner which will prevent the liberation and loss of native gases and prevent the association of the atmosphere with the coffee while contained in the container.

Also attempts have been made to pack other gas evolving food products, such as cheese and sour kraut, in vacuumized containers and in the packing of cheese it has been found that the gas evolved from the cheese has often caused bursting of metal containers, and as a result thereof attempts have been made to overcome this serious objection by providing valves in the containers for permitting the escape of such gases, but such devices have proved unpractical as moisture from the cheese has resulted in rusting the valves and causing the same to become inoperative. Also valved containers for the packing of roasted coffee have been tried, but as the containers often become inverted, particles of coffee have become lodged in the valves, rendering the same inoperative, and the use of valves in containers both for cheese and coffee, has been abandoned.

Also attempts have been made in packaging coffee to accomplish the desired results by sealing the coffee in cans having non-collapsible walls, which are, of course, impervious to moisture and air. Other attempts to seal the coffee in flexible containers such as Cellophane in which the walls are not only completely impervious to air or moisture have been attempted. In both of these types of containers it has been common practice to impose a partial vacuum upon the product before sealing it and in some instances, to provide an air space within the container, which will accommodate the developed gases. With such containers it has been necessary to provide a space within the container in which the gases evolved from the freshly ground coffee may expand for if a space were not provided to receive such gases the internal pressure resulting from such gases would burst the container. The developed gases create an appreciable degree of pressure within the container and for that reason the containers are not usually completely filled with coffee. In the instance of using a container having non-collapsible walls the internal pressure is restricted by the wall and the gas passes from the coffee and into the void between the coffee and the top of the container since the coffee is free to shift within the container. In the use of a Cellophane container the coffee gases will tend to expand the container and pass into the space left therein for accommodating the gases. The coffee oils or moisture tend to produce deterioration of the container walls.

The present invention contemplates the use of a completely filled hermetically sealed flexible elastic container made of a material impervious to air, moisture, coffee oils and greases of other food products and having limited and controlled stretchable characteristics, and the walls of which container are at all times collapsed against the entire mass of coffee or other food product packed therein, whereby the surrounding atmospheric pressure will maintain the coffee gases within the coffee grains so that the gases giving the coffee its freshness and flavor will be maintained in its original state within the coffee cells without exerting material internal pressure within the container, thereby insuring freshness of coffee or any other food product evolving gas and which deteriorates by loss of gas and contact with the atmosphere.

The invention also contemplates that prior to sealing the coffee or other food product in containers having the characteristic of limited expansiveness, the atmospheric air will be withdrawn therefrom so that no space will be provided within the container to accommodate evolved gases, thus insuring that since the walls of the container are impervious to air, moisture, fats and other greases, there will not be any possibility for air or moisture to seep into the container and produce oxidization of coffee oils or oils or greases of other products and produce deterioration of coffee or other products or cause staleness, loss of flavor and aroma and render such products unsuitable for use. It is also an object of the invention to provide a container, the walls of which are not only flexible but elastic, so that the walls will not crack under pressure and will not be punctured by the rough edges of ground coffee grains. In order to facilitate obtaining these characteristics it has been found advantageous to use the composition known to the trade as "pliofilm," and over which an initially non-stretching laminated sheet is applied yieldably to the composition sheet by a non-shrinking a non-setting adhesive which insures that the walls of the container will at all times remain soft and act as a flexible confining cushion for the material and which will allow the walls of the container to stretch only to a limited and controlled extent while permitting it to collapse and adding sufficient strength to maintain its shape.

The present invention, therefore, contemplates the provision of a flexible collapsible container impervious to air, moisture, oils and other greases, and which container is completely filled with ground freshly roasted coffee from which air is excluded and within which the coffee and its occluded aromatic gases are confined within the coffee cells while the coffee package retains its permanent shape.

In Patent No. 2,102,716, granted to me December 21, 1937, is described a container capable of collapsing and of distending, said container being formed with a laminated sheet wall including an inner sheet of flexible, pliable and stretchable material such as "pliofilm" impervious to air, moisture and the action of coffee oils and an outer flexible non-stretching sheet of material, said sheets being held together by a non-setting adhesive. It is an object of the present invention to materially reduce the cost of the container and the packing of roasted coffee and other food products evolving gas and at the same time provide a vacuum type, pressure-tight and air, gas, moisture and grease-proof container adapted to be completely filled with coffee or other food product evolving gas and capable of being collapsed around the product and of compressing the same into a hard solid mass and of being hermetically sealed and vulcanized so that the sealed vulcanized portions will be impervious to moisture, air, gas and grease.

It has been found that if the outer sheet or lamina of the laminated sheet wall be capable of a limited stretching a much cheaper grade of paper or similar material may be substituted for parchment or paper having similar strength characteristics necessary when the outer sheet or lamina is non-stretching, as explained in the aforesaid patent. The object of the present invention is to provide a container having a laminated sheet wall with an outer sheet or lamina of relatively thin, low or cheap grade paper having one or more slits adapted to completely circumscribe the packages of coffee or other food products and capable of permitting a limited stretching of the laminated sheet and thereby eliminating the more expensive outer sheet or lamina required when a non-stretching outer sheet is employed.

The invention is illustrated by way of example in the accompanying drawing in which:

Figure 1 is a view in perspective showing a package with which the present invention is concerned.

Figure 2 is a side elevation of the package disclosing the manner in which its ends are vulcanized.

Figure 3 is a view in plan showing the package with the ends vulcanized and prior to folding the vulcanized portions against the ends of the package.

Figure 4 is a plan view of the laminated sheet showing in the outer sheet or lamina a plurality of slits adapted to circumscribe completely the package.

Figure 5 is a view in section and elevation showing the method of vulcanizing the ends of the package.

Referring more particularly to the drawing, 6 indicates a coffee package with which the invention is particularly concerned, but it will be readily understood that it may be advantageously employed for various other products, such as cheese and sour kraut which evolve gas. The package may be formed from material commercially known as "pliofilm" which is a composition having the characteristics of being elastic, pliable, flexible, impervious to moisture, air, oil and other greases, and capable of forming vacuumized seams which will also be impervious to moisture, air, oil and other greases. This material has the additional characteristics of value in that it is not affected by moisture and weather conditions and will not crease, crack or break and will not become brittle or tend to be punctured by the grains of coffee packed within containers made from it. Any other sheet material having the characteristics of "pliofilm" may, of course, be employed.

The package or container 6 is preserved in permanent shape and size by an outer initially non-stretching laminated sheet 7 which is slitted and applied to the "pliofilm" sheet 8 by a layer of adhesive 9. The outer sheet or lamina 7 is preferably of a low grade thin fibrous paper which by the provision of one or more slits 10 has imparted to it a limited stretching characteristic, the degree of stretching being controllable by the number of slits 10 which are spaced apart and which are arranged so as to completely circumscribe the package, as clearly illustrated in Fig. 1 of the drawing. By providing an outer sheet or lamina capable of stretching to a limited degree a relatively thin, low grade of fibrous paper may be used instead of the parchment, glacine and similar material described in the aforesaid patent and rendered necessary by employing a non-stretching outer sheet or lamina.

The adhesive material 9 has the peculiar characteristic that while it is effective in maintaining the laminae in associated relation to each other, its non-setting entire wall structure is at all times flexible and yielding and produces a cushioning action. The various advantages enumerated for the material here used are different from those obtained by the use of Cellophane and like products since such products are not effectively impervious to air, moisture, oil and other greases, are subjected to climatic changes, will become brittle and shrink when exposed to air and eventually will crack or be punctured by the rough edges of coffee grains and cannot be vulcanized. The container made from the laminated structure here described is in the form of a tubular section having a vulcanized longitudinal seam, as indicated at 11 in Fig. 3 of the drawing. One end of the section is closed by a vulcanized seam 12 after which the bag thus formed is completely filled with coffee or other product. The structure is then placed within a suitable vacuum chamber 14. A closure 16 is fastened over the end of the vacuum chamber and a suction pipe 15 is attached to a suitable apparatus for exerting a suction action within the chamber where the container is sealed. The filled container is then formed with a vulcanized seam 12' at its mouth. This is accomplished by suitable heating and pressure elements 17 mounted upon levers 18 and actuated by a toggle joint 19 and its lever 20. Attention is directed to the fact that while the elements 17 apply heat to the "pliofilm" sheet 8 or other material having the characteristics of "pliofilm" to vulcanize the same, that due to the fact that the outer sheet 7 is paper or other suitable material and is interposed between the heating elements and the sheet 8 there is no tendency for the material to stick to the heating elements and thus nothing occurs during the vulcanizing operation which would tend to separate the vulcanized parts and allow them to become pervious to air, moisture, oil or other grease.

When the package is sealed it will be obvious that a condition of partial vacuum will occur within the container and that a condition of normal atmospheric pressure will occur exteriorly of the container and exert a pressure against the container walls. The walls of the container as has been previously described, comprise an inner sheet of flexible and pliable material which has the additional characteristics of being elastic and an outer sheet of flexible pliable material which has the characteristic of being stretchable to only a limited and controllable extent. The two sheets are held together by a layer of non-setting adhesive and the seams of the container are held in union due to the previous vulcanization. It is to be understood that before the container is seamed at the mouth it has been filled completely so that the coffee or other product is not loose within the package and so that there is no appreciable voids between the particles of the coffee and the container. As the partial vacuum has been drawn within the container the elastic inner layer of the container wall will collapse against the compacted mass of coffee grains and at points where the sharp edges of the coffee grains protrude this elastic material will have a tendency to stretch around the sharp portions to accommodate them without possibility that the grains will rupture the walls of the container. The non-setting layer of adhesive material will also contribute to this action and provide a cushion which will tend to prevent breaking, cracking or rupture from other causes. The outer container wall of initially non-stretching material having imparted to it limited stretching characteristics by the slitting of the outer sheet will hold the container and its contents in a permanent predetermined shape. By slitting the outer sheet so that the slits will completely circumscribe the package and divide the outer sheet of lamina into sections the characteristic of limited stretching is imparted to the outer sheet and the walls of the container thereby enabling a much less expensive outer sheet or lamina to be employed than is possible where the outer sheet or lamina is completely non-stretching as explained in the aforesaid patent. This characteristic of a limited, controllable stretching of the outer sheet greatly reduces the cost of packaging freshly ground coffee and other food products evolving gas and the container will be vacuum-tight and pressure-tight as it will have sufficient strength to withstand gas pressure on its interior and also atmospheric pressure on its exterior and at the same time will be air, gas, and water or moisture-proof, as well as grease-proof.

It has been found by experiments extending over an appreciable period of time that a container having walls of the composite structure herein shown will maintain coffee at an extraordinary and unexpected high degree of freshness at all times. This appears to be due to the fact that the coffee is confined directly within a wall structure impervious to air and moisture and which is not affected or acted upon by the native coffee oils. The container maintains the coffee compacted at such a high degree that the coffee gases are packed and held within the cells of the coffee grain, all of which action is in a great measure brought about due to the fact that atmospheric pressure at all times is exerting its force against the walls of the container tending to collapse the same and tending to hold the coffee grains in a highly compacted condition forming a hard solid mass which prevents coffee gases from being evolved from the ground coffee particles while in the package and which enables the package to be maintained in a vacuum condition and in its preformed shape with the coffee gases confined within the cells of the ground coffee particles until the package is opened or unsealed.

The relatively heavy pressure of the atmospheric air on the exterior of the package maintains the inner elastic sheet continuously in contact with the particles of coffee with the particles of coffee partially surrounded by it so that there is no air or gas space in which a gas may form, and it has been found by experience that the vacuum condition produced by vacuumizing the package is maintained for an indefinite period. While for convenience of illustration the package in Fig. 1 is shown smooth, in practice the container due to the compression of the inner elastic sheet around the particles of coffee in contact with the inner wall of the container presents a slightly irregular surface. When the package is vulcanized and sealed, air cannot enter the package and aroma cannot escape therefrom. Other foods than coffee may be processed in the same way as coffee to prevent air from entering the package and retain the flavor or aroma of the packed material or food. It has been found that cheese evolving gas may be packed in the same manner as coffee and may be vacuumized and sealed by vulcanization and maintained in a hermetically sealed condition for an indefinite length of time without permitting gases to be evolved from the cheese and bursting the package, as has been the case where it has been attempted to pack cheese in vacuumized metal containers.

It will thus be seen that the method and means of packing coffee and other products here shown will, owing to the employment of a thin cheap fibrous outer sheet of slitted paper, possess all of the advantages of the packaging method and means explained in the aforesaid patent and at the same time greatly reduce the cost thereof.

What is claimed is:

1. A method of packing products evolving gas which consists in placing the product within a container capable of collapsing and having the characteristic of a limited controlled distension, said container being formed with a laminated sheet wall including an inner sheet of flexible pliable and stretchable material impervious to air, moisture and the action of oils and other greases, and an outer initially non-stretching sheet of material, said sheets being united between their surfaces so as to exclude entrance of air between the sheets and the outer sheet being slitted to impart to it the characteristic of a limited stretching, the container being completely filled with the product, then exhausting air from the container causing the walls of the container to collapse around the product and compressing the same into a hard solid mass, and hermetically sealing and vulcanizing the inner wall of the container so that the sealed vulcanized ends of the container will also be impervious to moisture and air and the deteriorating action of oils and greases, and whereby atmospheric pressure acting upon the walls of the container will maintain the container in its collapsed position and the product in a compacted condition therein.

2. A method of packing products evolving gas which consists in placing the product within a container capable of collapsing and having the characteristic of a limited controlled distension, said container being formed with a laminated sheet wall including an inner sheet of flexible pliable and stretchable material impervious to air, moisture and the action of oils and other greases, and an outer initially non-stretching sheet of material, said sheets being united between their surfaces so as to exclude entrance of air between the sheets and the outer sheet being slitted to form a slit completely circumscribing the package to impart to it the characteristic of a limited stretching, the container being completely filled with the product, then exhausting air from the container causing the walls of the container to collapse around the product and compressing the same into a hard solid mass, and hermetically sealing and vulcanizing the inner wall of the container so that the sealed vulcanized ends of the container will also be impervious to moisture and air and the deteriorating action of oils and greases, and whereby atmospheric pressure acting upon the walls of the container will maintain the container in its collapsed position and the product in a compacted condition therein.

3. A method of packing products evolving gas which consists in placing the product within a container capable of collapsing and having the characteristic of a limited controlled distension, said container being formed with a laminated sheet wall including an inner sheet of flexible pliable and stretchable material impervious to air, moisture and the action of oils and other greases, and an outer initially non-stretching sheet of material, said sheets being united between their surfaces so as to exclude entrance of air between the sheets and the outer sheet being slitted at spaced points and forming slits completely circumscribing the package and dividing the outer sheet or lamina into sections to impart to it the characteristic of a limited stretching, the container being completely filled with the product, then exhausting air from the container causing the walls of the container to collapse around the product and compressing the same into a hard solid mass, and hermetically sealing and vulcanizing the inner wall of the container so that the sealed vulcanized ends of the container will also be impervious to moisture and air and the deteriorating action of oils and greases, and whereby atmospheric pressure acting upon the walls of the container will maintain the container in its collapsed position and the product in a compacted condition therein.

4. A vacuum package completely filled with a product evolving gas comprising a collapsible container of laminated material including an outer flexible sheet of initially non-stretchable material slitted to impart to the sheet the characteristic of limited stretching without rupture, and an inner sheet of flexible, pliable, stretchable material impervious to air, moisture, and grease, said sheets being united between their surfaces so as to exclude entrance of air between the sheets, said package being vacuumized hermetically sealed and said container being collapsed around the product and compressing the same into a hard, solid mass and conforming to the configuration of the exterior of the product whereby native gases are confined within the product and the package retained in its preformed shape and in vacuum condition until the package is unsealed.

5. A vacuum package completely filled with a product evolving gas comprising a collapsible container of laminated material including an outer flexible sheet of initially non-stretchable material having a slit completely circumscribing the package and dividing the outer sheet into sections and imparting to the outer sheet the characteristic of limited stretching without rupture, and an inner sheet of flexible, pliable, stretchable material impervious to air, moisture and grease, said sheets being united between their surfaces so as to exclude entrance of air between the two sheets, said package being vacuumized and hermetically sealed and said container being collapsed around the product and compressing the same into a hard, solid mass, and the inner sheet being stretched over the exterior of the mass and conforming to the configuration of the same, whereby the native gases are confined within the product and the package maintained in its preformed shape and in vacuum condition until the package is unsealed.

6. A vacuum package completely filled with a product evolving gas comprising a collapsible container of laminated material including an outer flexible sheet of initially non-stretchable material having a plurality of slits completely circumscribing the package and dividing the outer sheet into sections and imparting to the outer sheet the characteristic of limited stretching without rupture, and an inner sheet of flexible, pliable, stretchable material impervious to air, moisture, and grease, said sheets being united between their surfaces so as to exclude entrance of air between the two sheets, said package being vacuumized and hermetically sealed and said container being collapsed around the product and compressing the same into a hard, solid mass and the inner sheet being stretched over the exterior of the mass and conforming to the configuration of the same, whereby the native gases are confined within the product and the package maintained in its preformed shape and in vacuum condition until the package is unsealed.

7. A vacuum package completely filled with a product evolving gas comprising a collapsible container of laminated material including an outer initially non-stretchable sheet of thin, low grade, fibrous paper slitted to impart to the outer sheet the characteristic of limited stretching without rupture, and an inner sheet of flexible, pliable, elastic, stretchable material, said sheets being united between their surfaces so as to exclude entrance of air between the two sheets, said package being vacuumized and hermetically sealed and said container being collapsed around the product and compressing the same into a hard solid mass and the inner sheet being stretched over and conforming to the configuration of the exterior of the mass, whereby native gases are confined within the mass, and the outer sheet preventing the stretching and distention of the inner sheet by atmospheric pressure on the exterior of the container and maintaining the package in its preformed shape and in vacuum condition until the package is unsealed.

8. A vacuum package completely filled with ground coffee comprising a collapsible container of laminated material including an outer sheet of initially non-stretchable, thin, fibrous, low grade paper slitted to impart to it the characteristic of limited stretching without rupture, and an inner sheet of "plioform", said sheets being united between their surfaces so as to exclude entrance of air between the two sheets, said package being vacuumized and hermetically sealed and said container being collapsed around the ground coffee and compressing the same into a hard, solid mass, and the inner sheet being stretched over the individual coffee particles in contact with it and conforming to and partially surrounding the same, whereby the native coffee gases are confined within the cells of the coffee particles, and the outer sheet preventing the stretching and distention of the inner sheet by atmospheric pressure on the exterior of the container and maintaining the package in its preformed shape and in vacuum condition until the package is unsealed.

SAMUEL H. BERCH.